United States Patent
Honda et al.

(10) Patent No.: US 7,715,151 B2
(45) Date of Patent: May 11, 2010

(54) MICROACTUATOR, HEAD GIMBAL ASSEMBLY AND HARD DISK DRIVE USING THE SAME, AND METHOD OF MANUFACTURING HEAD GIMBAL ASSEMBLY

(75) Inventors: Takashi Honda, Hong Kong Science Park, Shatin, N.T. (HK); Hidetoshi Matsui, Hong Kong Science Park, Shatin, N.T. (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 756 days.

(21) Appl. No.: 11/427,053

(22) Filed: Jun. 28, 2006

(65) Prior Publication Data
US 2007/0002501 A1    Jan. 4, 2007

(30) Foreign Application Priority Data
Jul. 1, 2005    (JP)    ............... 2005-194198

(51) Int. Cl.
*G11B 5/56* (2006.01)
(52) U.S. Cl. .................................. 360/294.4
(58) Field of Classification Search .... 360/294.1–294.5
See application file for complete search history.

(56) References Cited

U.S. PATENT DOCUMENTS 6,362,939 B1 * 3/2002 Crane et al. .............. 360/294.5
2002/0036870 A1 * 3/2002 Shiraishi et al. .......... 360/294.4
2002/0051326 A1 * 5/2002 Shiraishi et al. .......... 360/294.4
2004/0037008 A1 * 2/2004 Yao et al. ................. 360/294.3
2006/0098347 A1 * 5/2006 Yao et al. ................. 360/294.4

FOREIGN PATENT DOCUMENTS

JP    2002-074870    3/2002

OTHER PUBLICATIONS

U.S. Appl. No. 11/426,091 to Honda, which was filed Jun. 23, 2006.
U.S. Appl. No. 11/461,480 to Honda, which was filed Aug. 1, 2006.
U.S. Appl. No. 11/531,208 to Honda, which was filed Sep. 15, 2006.
English language Abstract of JP 2002-074870, Mar. 15, 2002.

* cited by examiner

Primary Examiner—Craig A. Renner
Assistant Examiner—Tamara Ashford
(74) Attorney, Agent, or Firm—Greenblum & Bernstein, P.L.C.

(57) ABSTRACT

A microactuator includes: a base to be joined to a flexure; a pair of arms joined to the base; and PZT devices, mounted on the arms, to be deformed in an expanding or contracting manner based on driving signals applied, and the microactuator holds the side faces of the magnetic head slider between the arms. The length of each arm is set to a length same as or shorter than that of the magnetic head slider in a longitudinal direction.

5 Claims, 12 Drawing Sheets

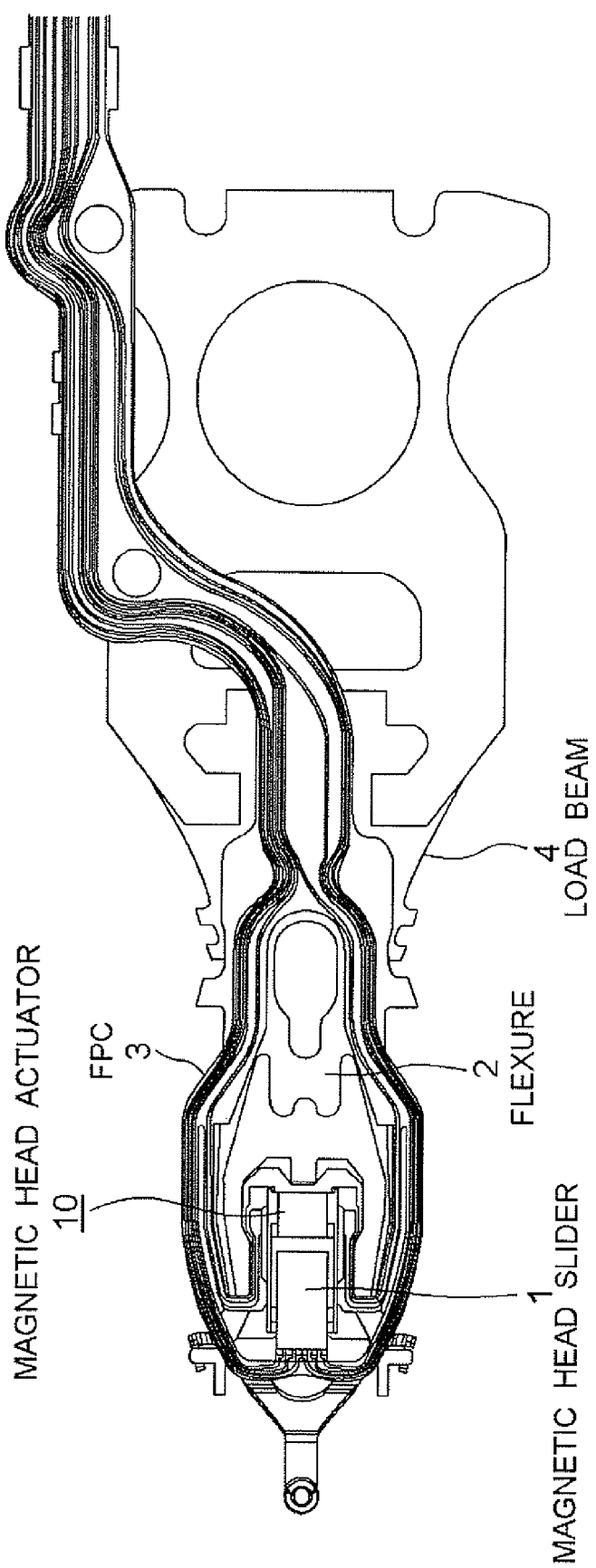

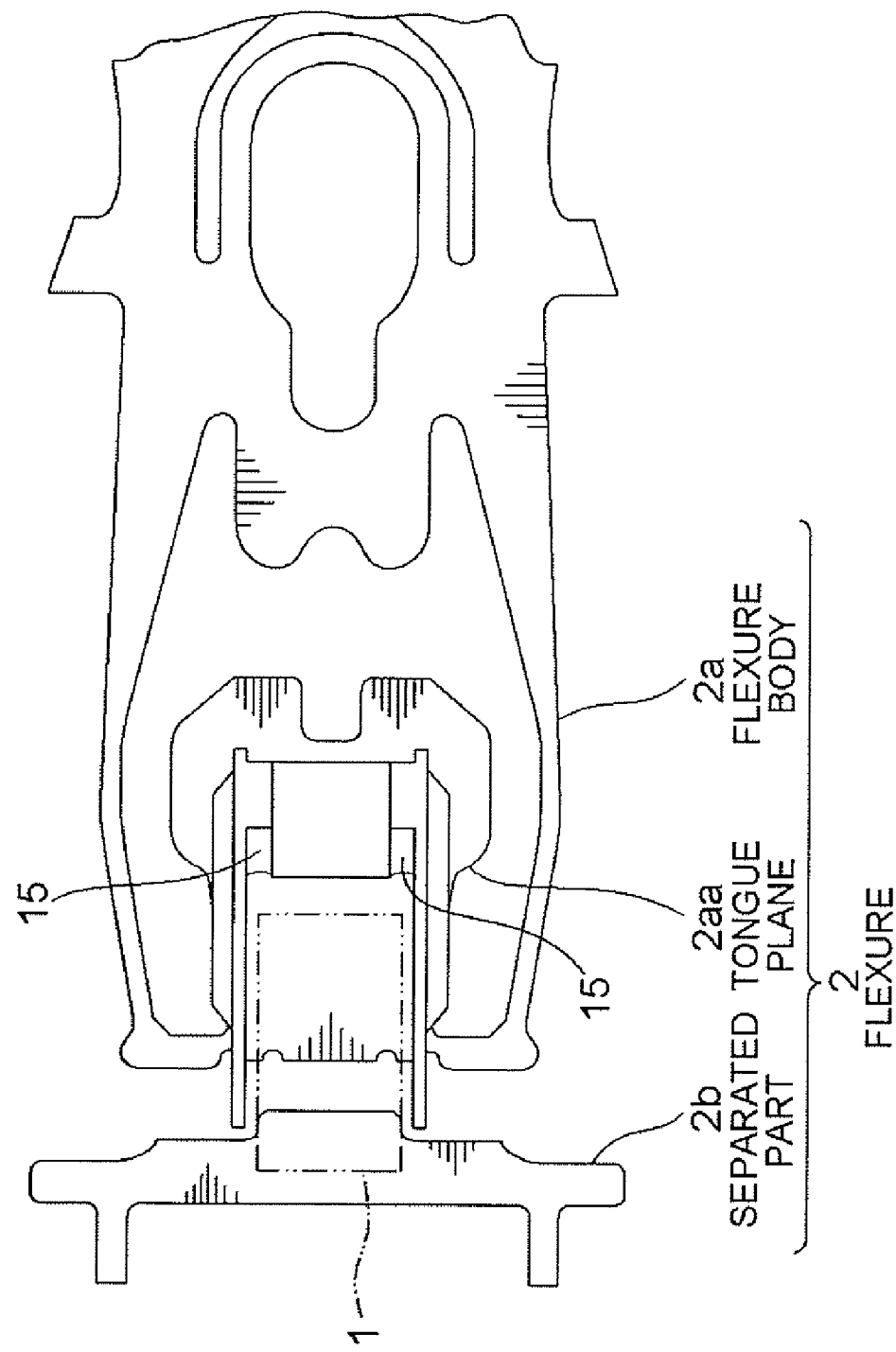

MICROACTUATOR, HEAD GIMBAL ASSEMBLY AND HARD DISK DRIVE USING THE SAME, AND METHOD OF MANUFACTURING HEAD GIMBAL ASSEMBLY

BACKGROUND OF THE INVENTION

1. Field of the Invention

The present invention relates to a microactuator, and in particular, to an actuator for precisely positioning a magnetic head. Further, the present invention relates to a head gimbal assembly using the actuator and its manufacturing method, and to a hard disk drive using the actuator.

2. Related Art

A hard disk drive, which is a data storage, is provided with a head gimbal assembly on which a magnetic head slider for reading or writing data from/into a magnetic disk, or a storage medium, is mounted. FIG. 7 shows a conventional example of a head gimbal assembly 100.

The head gimbal assembly 100 includes: a magnetic head slider 101; a flexure 102 having a spring property on which the magnetic head slider 101 is mounted on the tip part thereof; an FPC 103 (flexible printed circuit) formed on the flexure 102, for transmitting signals to the magnetic head slider 101; and a load beam 104 supporting the flexure 102. The load beam 104 is mounted on a head arm via a base plate not shown. Further, a plurality of head gimbal assemblies 100 are stacked and fixed to a carriage via respective head arms and pivotally supported so as to be driven rotationally by a voice coil motor to thereby constitute a head stack assembly (not shown).

The head gimbal assembly 100 is driven rotationally by the voice coil motor to thereby position the magnetic head slider mounted on the tip part thereof. In recent years, however, due to an increase in recording density of a magnetic disk, positioning accuracy of a magnetic disk with a control by a voice coil motor is not sufficient.

In view of the above, techniques for more precise positioning have been considered. An example thereof is disclosed in the publication of Japanese Patent Application Laid-Open No. 2002-74870 (Patent Document 1). The configuration of a conventional magnetic head actuator mounted on the head gimbal assembly 100 will be explained below with reference to FIGS. 7 to 11.

As shown in FIG. 7, a magnetic head actuator 110 is mounted on a tongue plane of the flexure 102. The magnetic head actuator 110 is formed in an almost U-shape, and holds the magnetic head slider 101 such that the read/write element is positioned on the opening end side. This will be explained in more detail below.

FIG. 8 shows the configuration of the actuator 110 for precisely positioning the magnetic head, on which the magnetic head slider 101 is mounted. FIG. 5A is a top view, and FIG. 5B is a side view. The magnetic head actuator 110 is formed in an almost U-shape, including a base 111 to be mounted on the flexure 102 and a pair of arms 112 and 113 joined so as to extend in the same direction from the both edges of the base 11, and a space is formed between the pair of arms 112 and 113. In the space between the pair of arms 112 and 113, the magnetic head slider 101 is accommodated and held by the pair of arms 112 and 113. The holding method in this case is, as shown in FIG. 8A, to provide an adhesive 114 such as epoxy resin on the inner sides of the respective arms 112 and 113 at parts near to the tips thereof to thereby fix the side faces near to the tip of the magnetic head slider 101 with the adhesive 114. Since the magnetic head slider 101 is accommodated in the space between the arms 112 and 113 such that the end face of the magnetic head slider 101 of the read/write element side are positioned near the tip parts of the arms 112 and 113, the length of the arms 112 and 113 is formed longer than that of the magnetic head slider 101 in the longitudinal direction.

In FIG. 8B, a magnetic disk will be positioned above the magnetic head slider 101 so as to face the upper surface of the magnetic head slider, so a read/write element (not shown) is formed on the surface facing the magnetic disk (upper surface in FIG. 8B) near the tip of the magnetic head slider 101, and terminals of a read/write element side are formed on the end face of the tip side thereof (left end face in FIG. 8B) (not shown).

Further, the base 111 and the pair of arms 112 and 113 of the magnetic head actuator 110 are integrally formed of a ceramic sintered body having elasticity. However, the joints of the respective arms 112 and 113 to the base 111 (attached parts of the arms) are provided with prescribed notches (gaps), which are filled with elastic bodies 115 such as epoxy resin.

On the side faces positioned outside the respective arms 112 and 113, piezoelectric devices 112a and 113b are mounted (not shown in FIG. 8B), respectively. The piezoelectric devices 112a and 113b expand or contract when a voltage is applied. Thereby, the elastic arms 112 and 113 are deformed in a bending manner almost along the magnetic disk surface. Accordingly, it is possible to swing-drive the read/write element of the magnetic head slider 101 mounted on the tip part of the pair of arms 112 and 113 almost along the magnetic disk surface, whereby precise positioning control can be performed.

Next, a state where the magnetic head actuator 110 is mounted on the flexure 102 in a conventional example will be explained in detail with reference to FIGS. 9 to 11. FIGS. 9 and 10 show the configuration only including the flexure 102 and the actuator 110, in which FIG. 9 is a top view and FIG. 10 is a side view. FIG. 11 shows an FPC 103 as well.

As shown in FIG. 9, the flexure 102 consists of a flexure body 102a forming the tongue plane 102aa of the gimbal structure and a separated part 102b forming flexure side terminals to be connected with head side terminals of the magnetic head slider 101. They are configured to be linked integrally by the FPC 103 as shown in FIG. 11.

First, the notches formed in the attached parts of the respective arms 112 and 113 of the actuator 110 are filled with the elastic epoxy resin 115. Next, the base 111 of the actuator 110 is fixed to a position near to the back end of the tongue plane of the flexure 102, and the tip sides of the arms 112 and 113 are fixed to the separated part 102b with an adhesive 117 or the like. Then, piezoelectric device side terminals, not shown, formed on the side faces of the arms 112 and 113 and trace side terminals formed on the tongue plane of the flexure 102 are connected by metal bonding or the like. Thereby, a voltage which is an expansion/contraction signal is applied to the piezoelectric devices 112a and 113a of the actuator 110 via the FPC 103 and 103b, as shown in FIG. 11.

Next, as shown in FIG. 11, the magnetic head slider 101 is disposed between the pair of arms 112 and 113, and the terminals of the read/write element side of the magnetic head slider 101 and the trace side terminals 103aa of the separated part 102b are connected by soldering 116. Further, the magnetic head slider 101 and the respective arms 112 and 113, that is, the side faces near to the tip of the magnetic head slider 101 and the inner side faces near to the tips of the arms 112 and 113 are fixed to each other with the adhesive 114.

Thereby, the read/write element which is the tip part of the magnetic head slider 101 is swing-driven as shown by the arrow X in FIG. 11 together with the separated part 102b linked to the flexure body 102a only with the FPC 103, along with extension or contraction of the arms 112 and 113. This enables precise positioning control with high accuracy.

[Patent Document 1] JP2002-74870A

On the other hand, as the capacity of a hard disk drive increases, the recording density of a magnetic disk further increases. In order to cope with it, although a magnetic head slider of a size called pico slider (e.g., length=1.25, width=1.00, height=0.30) has been used in the conventional example described above, a smaller magnetic head slider of a size called femto slider (e.g., length=0.85, width=0.70, height=0.23) is desired to be used. However, a femto slider is too minute in size of the slider itself, so the strength is weak. Corresponding to it, the actuator described above becomes minute as well, so the strength thereof becomes weak same as the slider. This causes a problem that the reliability might be lowered.

In order to cope with a magnetic disk of high recording density while maintaining the strength, a use of a magnetic head slider formed in a size between the pico slider and the femto slider (hereinafter called as a "pemto" slider) has been considered.

In the case of mounting a pico slider of the conventional example on the actuator 110, on the side of the surface opposite to the flexure 102, the arms 112 and 113 of the actuator 110 and the magnetic head slider 101 are located on the almost same plane as shown in FIG. 10. Accordingly, the flexure body 102a and the separated part 102b are positioned almost on the same plane, so terminals of the separated part 102b and the magnetic head slider 101 can be connected easily.

However, when attempting to realize the technique of connecting the flexure 102 and the magnetic head slider 101 of the conventional example with a pemto slider which is a magnetic slider of a new size thinner than the pico slider, a problem described below may be caused. FIG. 12 shows a state where a pemto slider 101' is mounted.

The pemto slider 101' has higher strength since it is not so minute as a femto slider, but is thinner than a pico slider. Therefore, when the pemto slider 101' is mounted between the arms 112 and 113 as shown in FIGS. 12A and 12B, the distance D between the pemto slider 101' and the separated part 102b of the flexure 102 becomes longer, which causes a problem that connection between the terminals on the read/write element side formed on the pemto slider 101' and the trace side terminals formed on the separated part 102b becomes difficult. This is because the upper surface of the pemto slider 101' in FIG. 12B faces a magnetic disk, so it is impossible to dispose the pemto slider 101' closer to the flexure 102.

On the other hand, in order to cope with the problem mentioned above, the height of the arms 112 and 113 may be designed to be lower such that the flexure-facing surface of the thin pemto slider 101' is located on the same plane of the surfaces facing the flexure of the arms 112 and 113. However, this causes a problem that the strength of the important actuator 110, which holds the magnetic head slider 101' and performs precise positioning control, is reduced same as the case of using a femto slider mentioned above, resulting in lowering of the reliability of the hard disk drive.

SUMMARY OF THE INVENTION

It is therefore an object of the present invention to provide a microactuator for a magnetic head, capable of solving disadvantages involved in the above-described conventional example, and in particular, increasing the strength of the structure while maintaining highly accurate positioning control with respect to a magnetic head of high recording density, and further, reducing the manufacturing cost by utilizing the conventional manufacturing process.

In order to achieve the object, a microactuator, which is one mode of the present invention, is a microactuator which holds side faces of a magnetic head slider between arms, comprising: a base to be joined to a flexure; a pair of arms joined to the base; and PZT devices, mounted on the respective arms of the pair of arms, to be deformed in an expanding or contracting manner based on a driving signal applied. The length of each arm is same as or shorter than the length of the magnetic head slider in the longitudinal direction.

According to the invention mentioned above, first, the pair of arms are deformed in a bending manner in one direction due to the PZT devices deformed in an expanding or contracting manner by a driving signal. Then, the tip part of the magnetic head slider held by the arms, on which a read/write element is formed, is swing-driven together with a separated part linked, corresponding to the deformation of the arms. In this case, since the arms are set to be short, the read/write element of the magnetic head slider is disposed to protrude from the arms, so the read/write element can swing larger relative to the bending amount of the arms, whereby a large swinging range can be maintained. Specifically, taking into account a space required for swing of the magnetic head slider being formed on the base side, the length of the arms should be same as or shorter than that of the magnetic head slider such that the magnetic head slider protrudes from the tips of the arms consequently, whereby the wide swinging range can be secured. Further, by setting the length of the arms short, an effect of improving the strength of the actuator can also be achieved.

Further, by disposing the magnetic head slider such that the read/write element side thereof protrudes from the tips of the arms, it is possible to prevent a contact between the separated part to be connected with the terminals of the read/write element side and the arms. Thereby, stable positioning drive operation can be realized. Further, even if the height of the arms holding the magnetic head slider is set to be larger than the thickness of the magnetic head slider, it is possible to prevent a contact between the separated part to be connected with the terminals of the read/write element side and the arms, same as the above-mentioned case, so stable swinging operation can be maintained. In this way, it is possible to set the height of the arms higher, and to improve the strength of the actuator.

Since it is possible to keep the wide swinging range of the magnetic head slider and to set the arms short and high with the configuration described above, the strength of the actuator holding the magnetic head slider can be increased, and the reliability of the hard disk in which the actuator is mounted can be improved. Further, since only the arrangement of the magnetic head slider and the corresponding arrangement of the separated part differ from the conventional manufacturing process, the conventional manufacturing method can be utilized, which leads to a reduction in the manufacturing cost.

In this case, if notches are formed in the joints between the arms and the base, the length of each notch is not included in the length of the arm. Namely, the depth of the space accommodating the magnetic head slider defined by the arms and the base sets the length of the arm, which should be same as or shorter than the length of the magnetic head slider.

Further, a head gimbal assembly, which is another mode of the present invention, comprises: a microactuator including a base to be joined to a flexure, a pair of arms joined to the base, and PZT devices, mounted on the respective arms of the pair of arms, to be deformed in an expanding or contracting manner based on a driving signal applied, and holding side faces of the magnetic head slider between the arms; the flexure, joined to the base of the microactuator, including a separated part having trace side terminals to be connected with terminals of the read/write element side of the magnetic head slider; and the magnetic head slider held by the pair of arms so as to protrude from one end side of the pair of arms such that the separated part does not contact the pair of arms.

In the configuration described above, the protruding distance of the magnetic head slider from the one end side of the pair of arms is at least a distance from the mounting position of the trace side terminals formed on the separated part of the flexure to the end of the separated part of the arm side.

Further, it is desirable to form a hard disk drive by mounting the head gimbal assembly having the above-described characteristics.

According to the configuration described above, the read/write element of the magnetic head slider protrudes from the tips of the arms, so it is possible to enlarge the swinging range of the read/write element while reducing the length of the arms, same as the actuator described above. Further, by disposing the magnetic head slider such that the read/write element side thereof protrudes from the tips of the arms, it is possible to prevent a contact between the separated part joined to the terminals of the read/write element side and the arms. Accordingly, even if the height of the arms holding the magnetic head slider is set larger than the thickness of the slider, swinging operation is not affected. Since the arms can be set short and high as described above, it is possible to increase the strength of the actuator holding the magnetic head slider, and to improve the reliability of the hard disk in which the actuator is mounted.

Further, a method of manufacturing a head gimbal assembly, which is another mode of the present invention, is a method of manufacturing a head gimbal assembly comprising a step of mounting a microactuator, in which side faces thereof are held between a pair of arms, on a flexure having a separated part on which trace side terminals are formed. This method is characterized as not to include a step of fixing the separated part to the arms.

With this configuration, the separated part can be connected with the terminals of the read/write element side of the magnetic head slider while being spaced apart from the arms. As a result, the magnetic head slider can be mounted so as to protrude from the arms. Accordingly, the arms can be set short and high as described above, so it is possible to improve the strength of the actuator, and to manufacture a head gimbal assembly with high reliability.

EFFECT OF THE INVENTION

The present invention is configured and works as described above, so it is possible to improve the strength of the actuator holding and swing-driving the magnetic head slider while keeping the swinging range. Correspondingly, it is possible to prevent the separated part of the flexure connected with the magnetic head slider from contacting the arms, whereby stable precise positioning control can be realized. This is an excellent effect which has not been achieved conventionally.

BRIEF DESCRIPTION OF THE DRAWINGS

FIG. 2 is a diagram showing the configuration of a head gimbal assembly;

FIGS. 3A and 3B are diagrams showing the configuration of an actuator holding a magnetic head slider, in which FIG. 3A is a top view and FIG. 3B is a side view;

FIG. 4 is a top view showing a state where the actuator is mounted on a flexure;

FIGS. 8A and 8B are diagrams showing the configuration of a conventional actuator holding a magnetic head slider, in which FIG. 8A is a top view and FIG. 8B is a side view;

FIGS. 12A and 12B are diagrams showing a state where the actuator and the magnetic head slider are mounted on the flexure in the conventional example, in which FIG. 12A is a top view and FIG. 12B is a side view.

DESCRIPTION OF PREFERRED EMBODIMENT

The present invention is characterized in that a magnetic head slider is held protrudingly from the tip side of a pair of arms to thereby improve the strength of a microactuator while maintaining the swinging range. Hereinafter, an embodiment will be described in detail.

Embodiment 1

Figure 1:
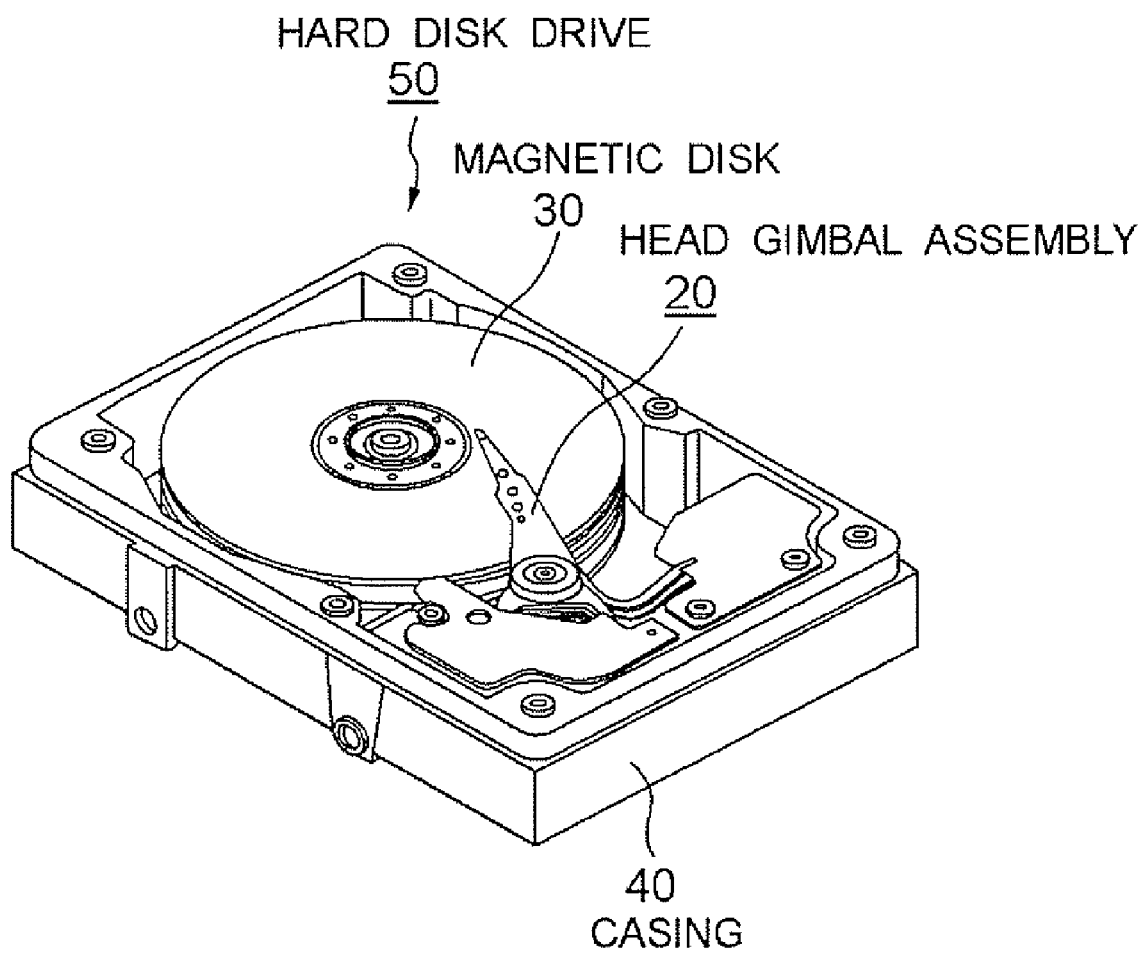
FIG. 1 is a diagram showing the configuration of a hard disk drive.
Figure 3A:
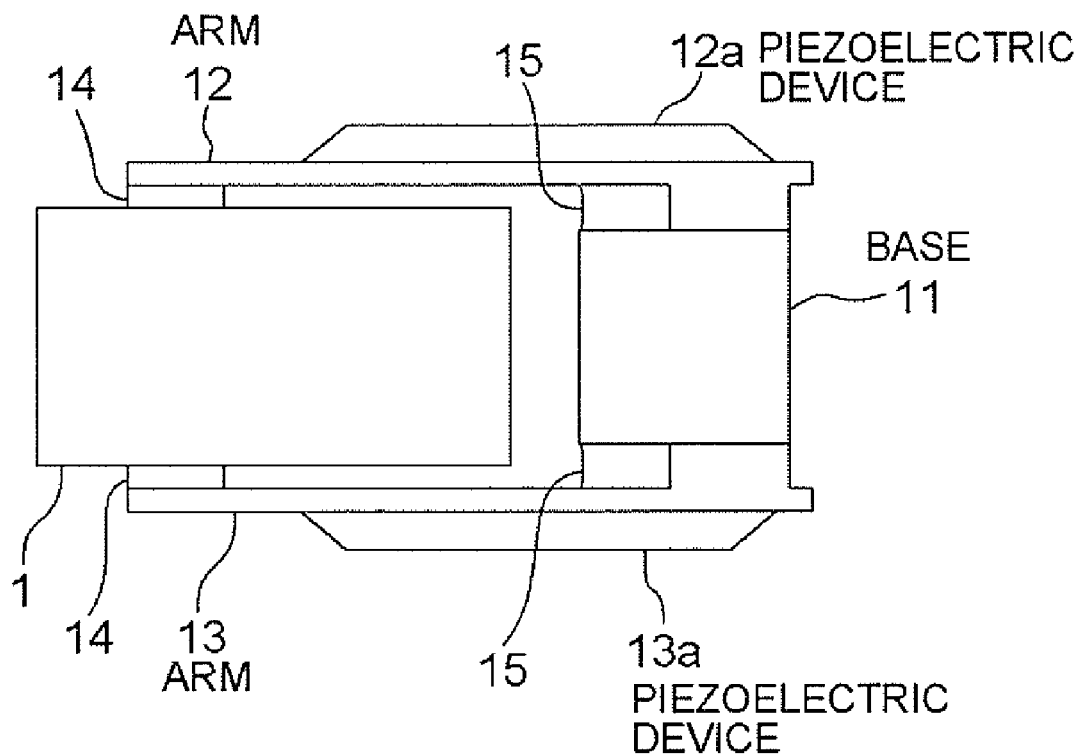
Figure 3B:
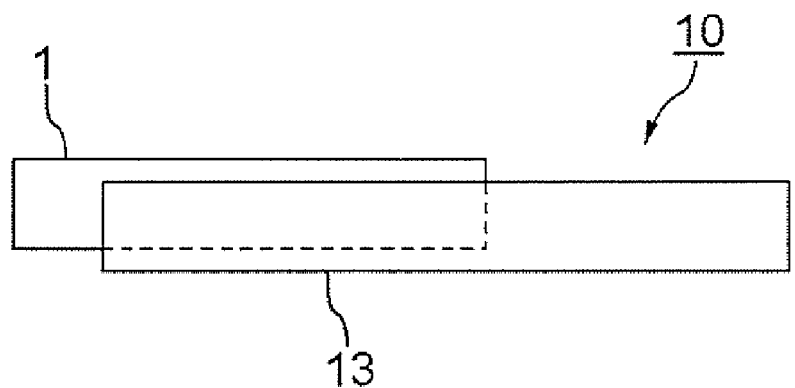
Figure 5:
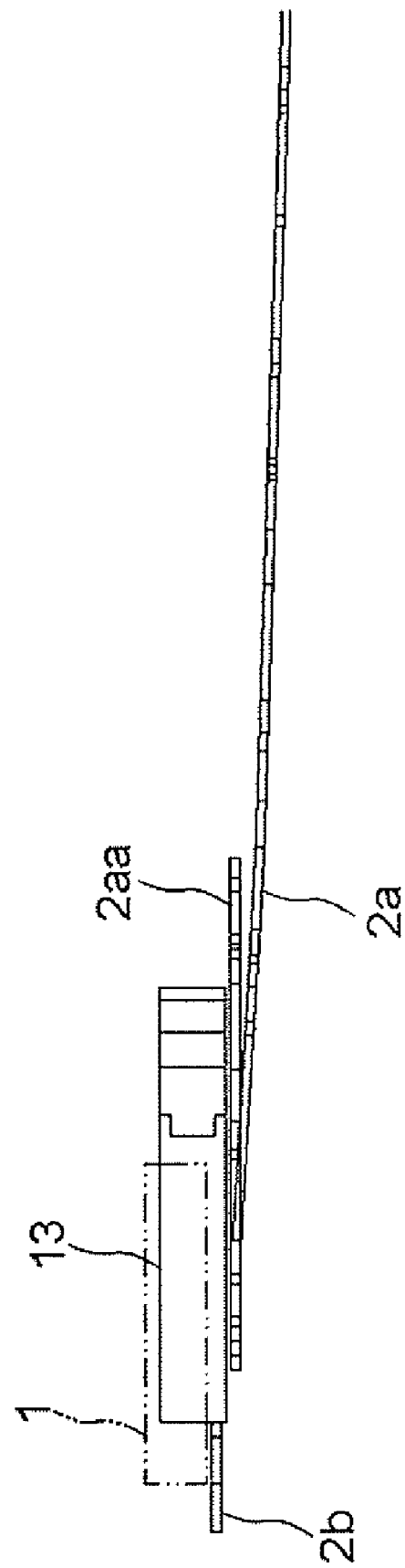
FIG. 5 is a side view of FIG. 4.
Figure 6:
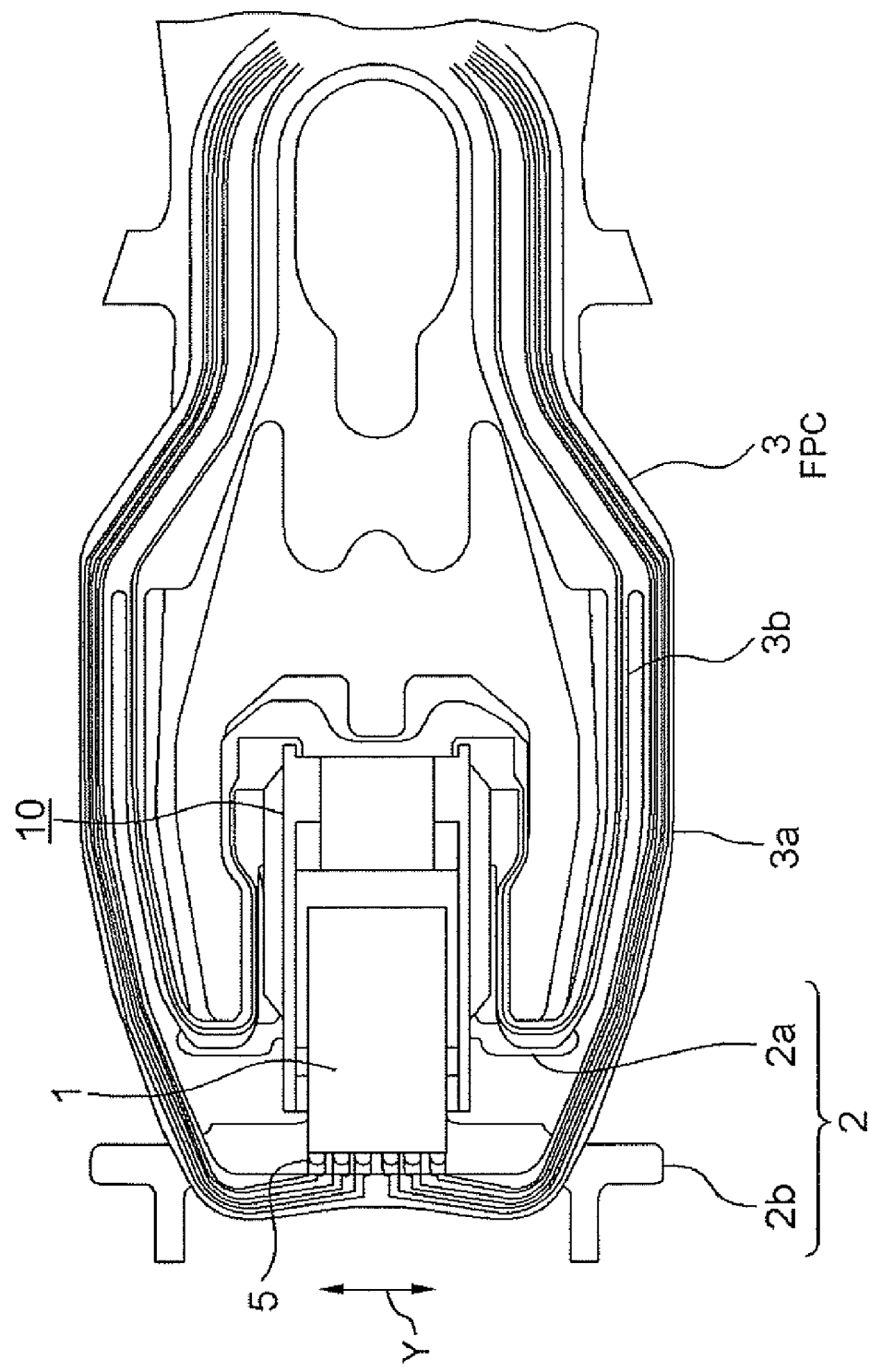
FIG. 6 is a top view showing a state where a magnetic head slider is mounted on the flexure with an FPC.
Figure 7:
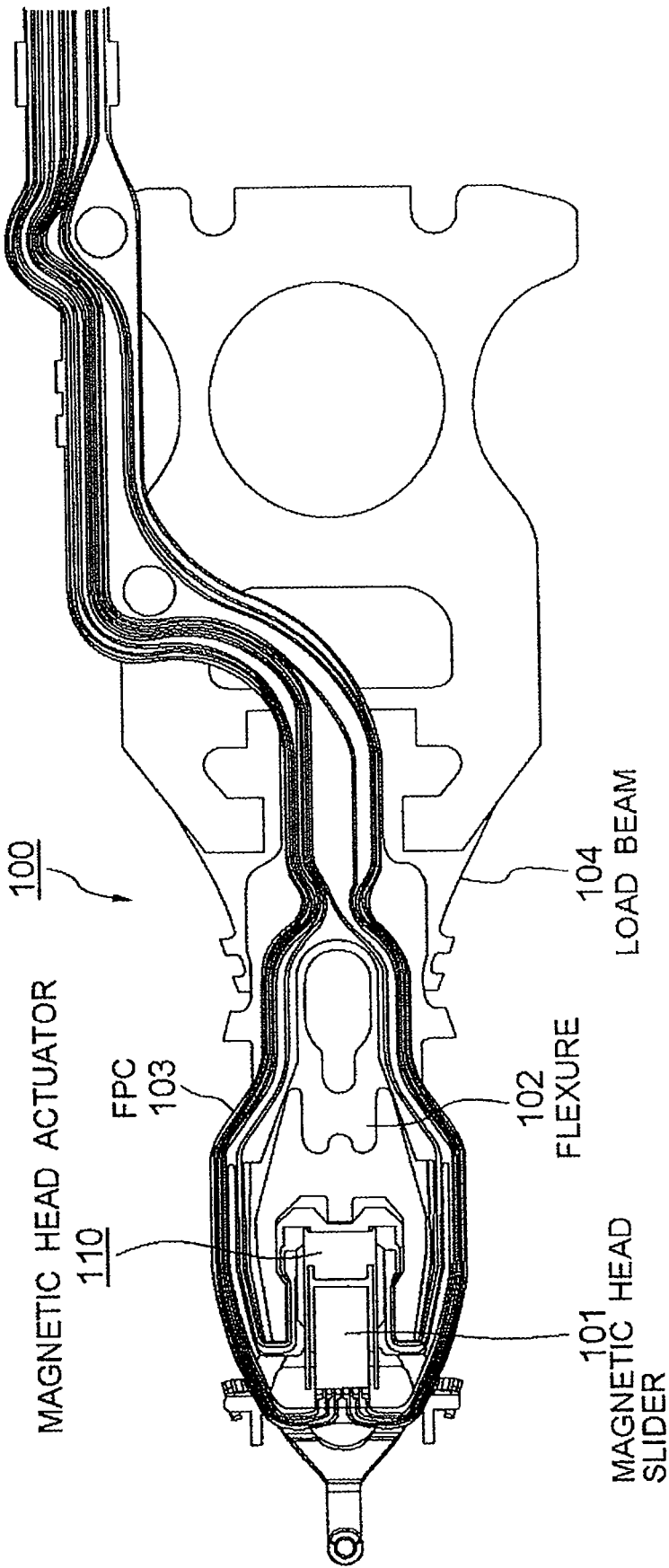
FIG. 7 is a diagram showing the configuration of a conventional head gimbal assembly.
Figure 8A:
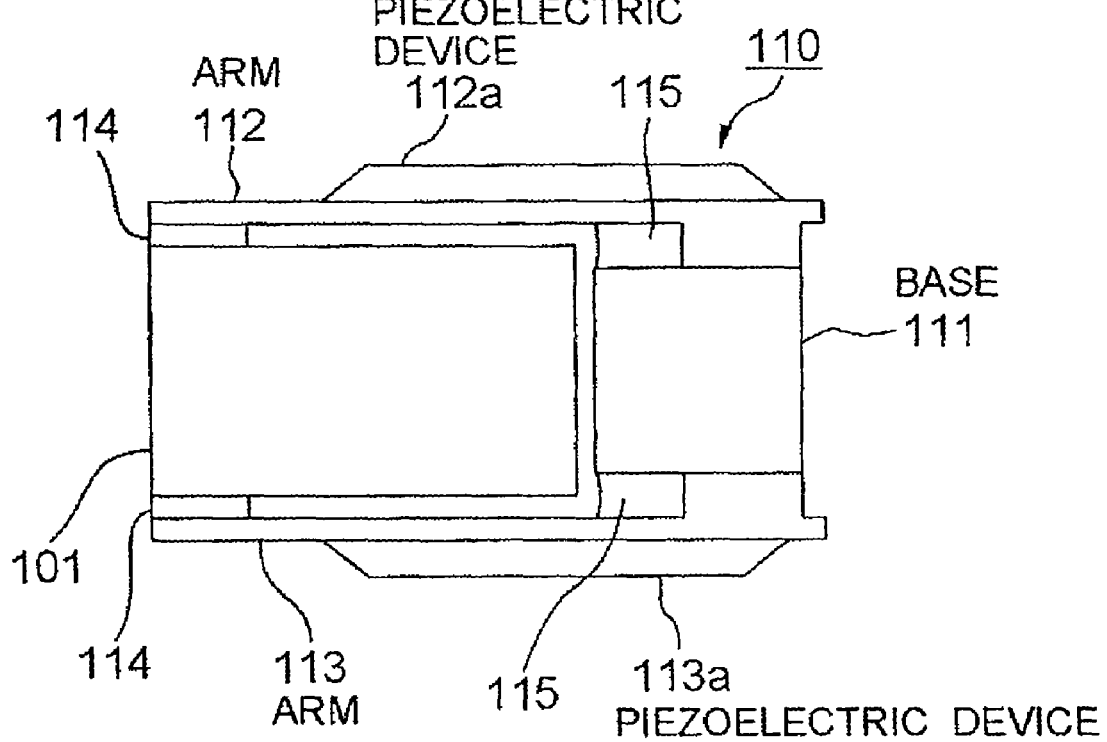
Figure 8B:
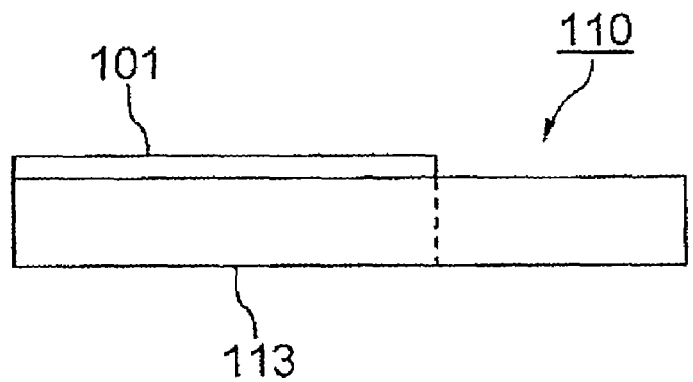

An embodiment of the present invention will be explained with reference to FIGS. 1 to 6. FIG. 1 is a diagram showing the configuration of a hard disk drive, and FIG. 2 is a diagram showing the configuration of a head gimbal assembly. FIGS. 3A and 3B are diagrams showing the configuration of a microactuator for a magnetic head. FIGS. 4 to 6 are illustrations showing the procedure of mounting the actuator.

[Configuration]

A hard disk drive 50 shown in FIG. 1 includes, in a casing 40, head gimbal assemblies 20 on each of which a magnetic head slider 1 for reading or writing data from/into a magnetic disk 30, which is a storage media, is mounted. Note that a plurality of magnetic disks 30 are provided therein, and a plurality of head gimbal assemblies 20 are stacked on the carriage correspondingly to thereby constitute a head stack assembly.

The head stack assembly is pivotally supported by a voice coil motor so as to be driven rotationally. Positioning control of the magnetic head slider 1 mounted at the tip part of each head gimbal assembly 20 is performed by being driven rotationally by the voice coil motor. Further, in the present invention, each head gimbal assembly 20 has a microactuator 10

(hereinafter referred to as an actuator) for a magnetic head, which holds the magnetic head slider 1 at the tip part thereof to thereby perform precise positioning control of the read/write element of the magnetic head slider 1. Hereinafter, the head gimbal assembly and the actuator will be explained in detail, particularly.

FIG. 2 shows the configuration of the head gimbal assembly 20 of the present invention. The head gimbal assembly 20 includes: the magnetic head slider 1; a flexure 2 having elasticity in which the magnetic head slider 1 is mounted on the tip part thereof; an FPC 3 (flexible printed circuit) which is formed on the flexure 2 and transmits signals to the magnetic head slider 1; and a load beam 4 supporting the flexure 2. The load beam 4 is to be mounted on a head arm via a base plate not shown.

Since the magnetic head slider 1 is mounted on the flexure 2 via the actuator 10 performing precise positioning as described above, the flexure 2 is formed in a shape corresponding thereto. The configuration will be explained with reference to FIG. 4. FIG. 4 only shows the flexure 2 and the actuator 10. Although the FPC 3 is formed on the flexure 2, it is omitted in FIG. 4.

Figure 9:
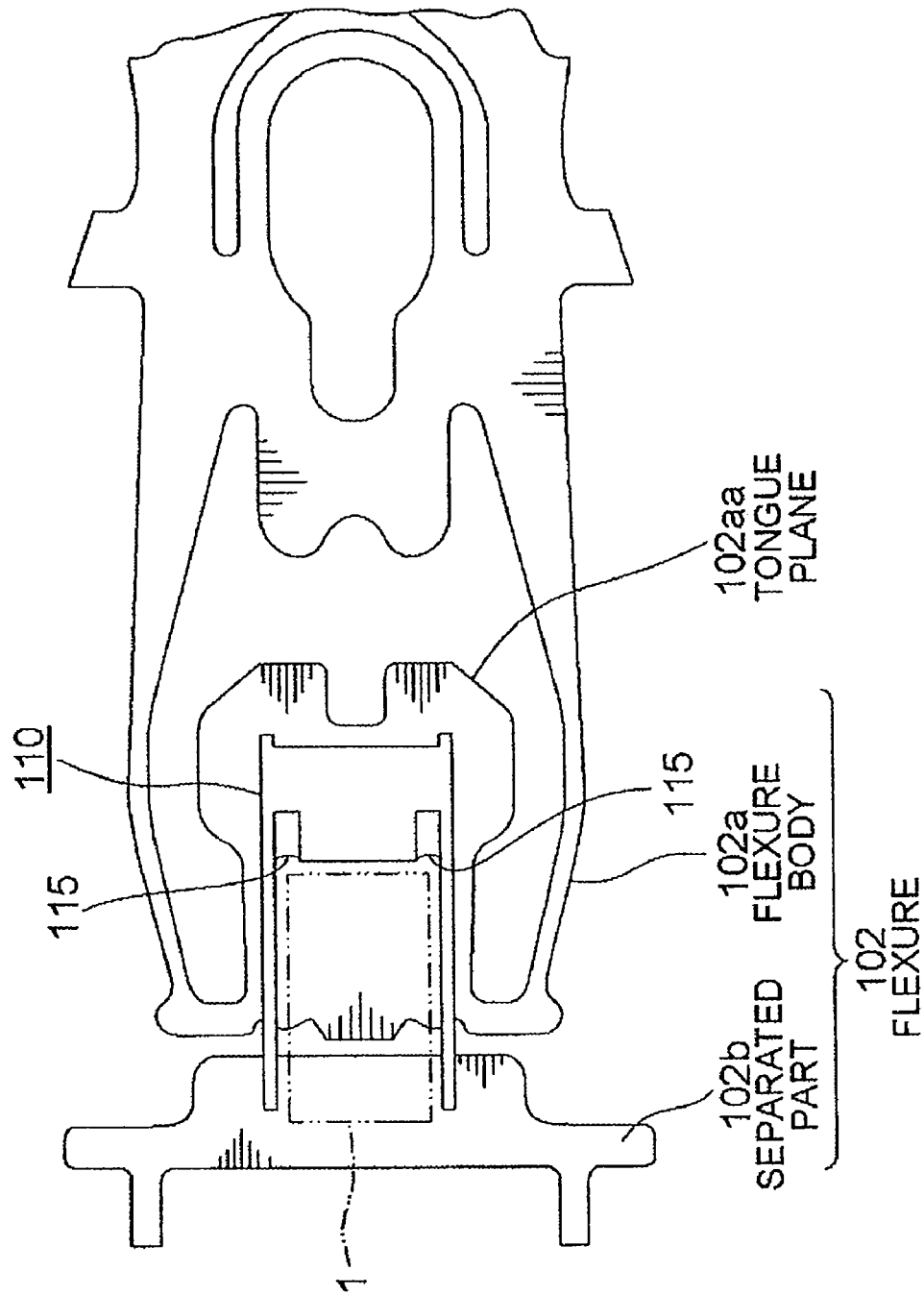
FIG. 9 is a top view showing a state where the actuator is mounted on a flexure in a conventional example.
Figure 10:
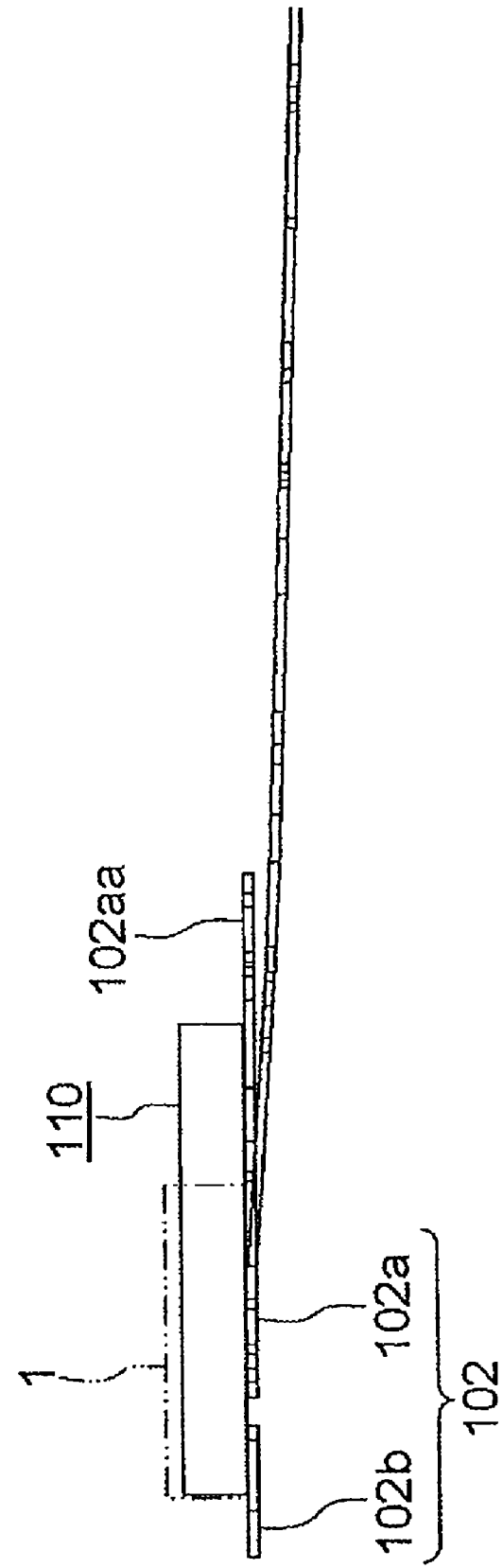
FIG. 10 is a side view of FIG. 9.
Figure 11:
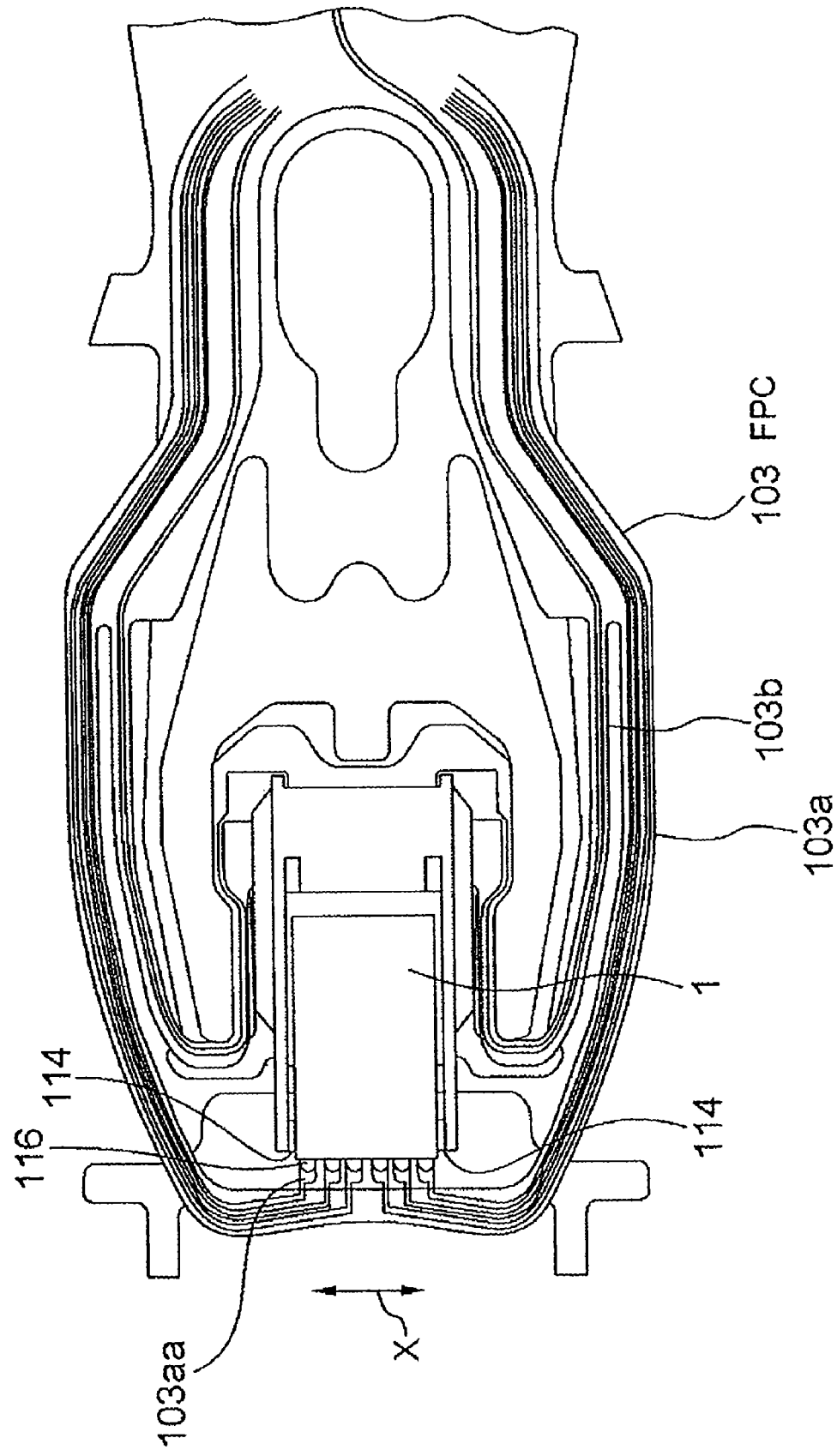
FIG. 11 is a top view showing a state where a magnetic head slider is mounted on the flexure with an FPC in the conventional example.

The flexure 2 is mounted on the load beam 4, and consists of a flexure body 2a having elasticity in which a tongue plane 2aa is formed, and a separated part 2b separated from the flexure body 2a and connected by soldering with terminal of the read/write element side (not shown) formed on the tip of the magnetic head slider 1 (left end part in FIG. 4). Note that the basic configuration of the flexure 2 is same as that of the conventional example (see FIG. 9).

Next, the configuration of the micro actuator 10 for a magnetic head, which is a characteristic of the present invention, will be explained with reference to FIGS. 3A and 3B. FIGS. 3A and 3B are diagrams showing the configuration of the actuator 10 holding the magnetic head slider 1, in which FIG. 3A is a top view and FIG. 3B is a side view.

The actuator 10 is formed in an almost U-shape including the base 11 to be mounted on an actuator fixing part 2b of the flexure 2 described later and a pair of arms 12 and 13, joined to the both ends, extending in the same direction. The base 11 and the pair of arms 12 and 13 of the actuator 10 are formed integrally of a ceramic sintered body having elasticity. Note that the basic configuration of the actuator 10 itself is almost same as the conventional one described above. That is, it is almost same as one holding a pico slider (e.g., length=1.25, width=1.00, height=0.30) conventionally used and performing precise positioning control, but dimensions such as length and height of the arms 12 and 13 are slightly different. This will be described later.

Further, on the side faces of the respective arms 12 and 13, piezoelectric devices 12a and 13a such as PZT are mounted (not shown in FIG. 3B). These piezoelectric devices 12a and 13a are devices which expand or contract when a voltage is applied. Thereby, the elastic arms 12 and 13 will be deformed in a bending manner almost along the magnetic disk surface. Accordingly, in order to allow the arms 12 and 13 to be deformed, the attached parts of the arms 12 and 13 to the base 11 are provided with prescribed notches (gaps) respectively, which are filled with elastic bodies 15 such as epoxy resin. With such a configuration, bending deformation of the pair of arms 12 and 13 can be performed smoothly, so it is possible to swing-drive the read/write element of the magnetic head slider 1 mounted at the tips thereof almost along the magnetic disk 30 surface, and to perform precise positioning.

In the opening of the almost U-shaped actuator 10, that is, in the space defined between the pair of arms 12 and 13, the magnetic head slider 1 is accommodated and held by the arms 12 and 13.

in this case, the magnetic head slider 1 held by the actuator 10 in the present embodiment is one of a size between a pico slider and a femto slider (called "pemto" slider), that is, length=1.25, width=0.70 and height=0.23 for example. In particular, it is thinner than a pico slider.

On the other hand, the actuator 10 to be used has almost same configuration of that used in a conventional pico slider. Accordingly, a head gimbal assembly can be manufactured by using conventional basic technical matters such as manufacturing procedures of a head gimbal assembly. However, in the present invention, the size of the actuator 10 relative to the magnetic head slider 1 and configuration and method of mounting the magnetic head slider 1 and the flexure 2 are somewhat different from conventional ones, which are characteristics of the present invention.

As shown in FIGS. 3A and 3B, the magnetic head slider 1 is held such that the end face of the read/write element side (tip part) thereof is disposed protrudingly from the tip side (one end side) of the arms 12 and 13. In FIGS. 3A and 3B, the magnetic head slider 1 is held so as to protrude about one sixth of the whole length thereof. Specifically, the protruding distance is a distance from the mounting position of trace side terminals formed on the separated part 2b of the flexure 2 with respect to the magnetic head slider 1, to the end part of the separated part 2b of the arm 12 and 13 side.

By protruding the magnetic head slider 1 from the tips of the arms 12 and 13, the swinging range of the read/write element positioned on the tip of the slider 1 due to bending deformation of the arms 12 and 13 can be set wide, as described later. As a result, the length from the attached parts to the base 11 to the tips of the arms 12 and 13 can be shorter than the conventional case. Explanation will be given more specifically. Taking into account provision of a necessary space on the base 11 side such that the back end side of the magnetic head slider 1 will not contact the base 11 due to swing of the magnetic head slider 1, the length of the arms 12 and 13 should be same as or shorter than the length of the magnetic head slider 1 held in the longitudinal direction from the joined part (attached part) to the base 11. Consequently, the read/write element of the magnetic head slider 1 protrudes from the tips of the arms 12 and 13, whereby the swinging range can be secured. Thereby, the rigidity of the arms 12 and 13 can be improved.

Figure 12A:
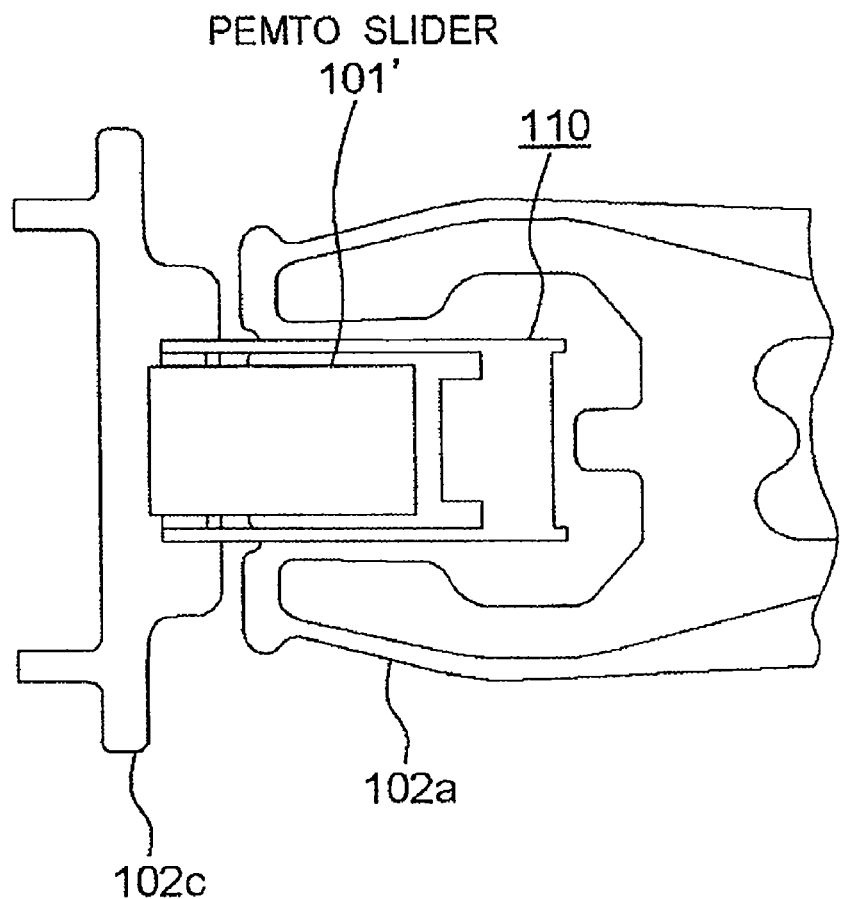
Figure 12B:
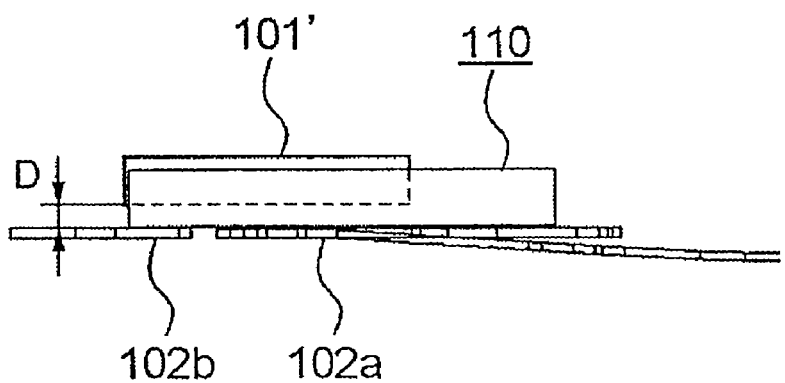

In this case, the length of the arms 12 and 13 does not take into account the notches formed in the joints between the respective arms 12 and 13 and the base 11. That is, the length of the arm from the surface facing the magnetic head slider 1 of the base 11 is set to the length same as or shorter than the length of the magnetic head slider 1 in the longitudinal direction, without taking into account the notch. In other words, the depth of the space for accommodating the magnetic head slider 1 defined by the arms 12 and 13 and the base 11 sets the length of the arms 12 and 13, and such a length should be the length of the magnetic head slider 1 or shorter. Note that the notches (parts filled with the reference numeral 15) shown in FIG. 3A are formed such that the joints to the base 11 will not interfere the bending deformation of the arms 12 and 13 so as to realize smooth bending operation Further, in FIG. 3B, since the upper side indicates a surface facing the magnetic disk 30, the read/write element is formed on the upper surface of the magnetic head slider 1. Accordingly, the position of the disk-facing surface (upper surface) of the magnetic head slider 1 will not change with respect to the arms 12 and 13. That is, the magnetic head slider 1 is positioned closer to the magnetic disk 30 side (upper side) by a predetermined distance than the surfaces facing the magnetic disk of the arms 12 and 13 (lower surfaces of the arms 12 and 13), so the flexure-facing surface (lower surface) of the magnetic head slider 1 is positioned at a farther distance from the flexure 2 (flexure body 2a) than the case of mounting a pico slider (see FIG. 12B).

In order to correspond to the position of the magnetic head slider 1 in the up and down direction described above, in the head gimbal assembly 20 of the present invention, the separated part 2b of the flexure 2 joined to the terminals of the read/write element side of the slider 1 are arranged so as to be close to the magnetic head slider 1 corresponding to the flexure-facing surface of the magnetic head slider 1 protruding from the tips of the arms 12 and 13, as shown in FIG. 5. Namely, the separated part 2b is arranged closer to the magnetic head slider 1 than the flexure body 2a, and the distance between the magnetic head slider 1 and the separated part 2b is set to a distance enabling soldered joint. Thereby, the terminals of the read/write element side and the trace side terminals can be connected easily by soldering 5 as described later.

Since the separated part 2b is disposed on the tip side of the arms 12 and 13 (see FIG. 5), the separated part 2b of the flexure 2 will not be disposed at the lower parts of the arms 12 and 13, so the height of the arms 12 and 13 in a direction of the flexure-facing surface (height along the thickness direction of the magnetic head slider 1) can be set to a conventional height. Thereby, it is possible to maintain the rigidity of the arms 12 and 13 even if the magnetic head slider 1 is as thin as the pemto slider 1.

[Manufacturing Method]

Next, a method of manufacturing a head gimbal assembly will be explained with reference to FIGS. 4 to 6. Note that FIGS. 4 and 5 show a configuration only including the flexure 2 and the actuator 10, and the FPC 3 is omitted. FIG. 4 is a top view, and FIG. 5 is a side view thereof. FIG. 6 shows the FPC 3 as well.

As shown in FIG. 4, first, the epoxy resin 15 having elasticity is filled in the notches formed at the attached parts of the arms 12 and 13 of the actuator 10. Then, the base 11 of the actuator 10 is mounted on the back end part of the tongue plane 2aa of the flexure 2 and fixed with an adhesive or the like. Then, as shown in FIG. 5, position of the separated part 2b of the flexure 2 is set as well. That is, the position is adjusted such that the terminals of the read/write element side of the magnetic head slider 1 to be held by the actuator 10 and the trace side terminals of the separated part 2b are arranged to have a distance capable of being joined by the soldering 5. In the example shown, the separated part 2b is positioned ahead of the tip parts of the arms 12 and 13, and is disposed near the magnetic disk side (upper side) so as to be close to the magnetic head slider 1. Note that since the FPC 3 (3a, 3b) is formed on the flexure 2 (not shown in FIGS. 4 and 5 but shown in FIG. 6), the flexure body 2a and the separated part 2b are configured integrally. Further, since the FPC 3 has elasticity, it can flexibly cope with positioning adjustment of the separated part 2b described above.

Next, piezoelectric device side terminals (not shown) formed on the side faces of the arms 12 and 13 of the actuator 10 and the trace side terminals formed on the tongue plane 2aa are connected by metal bonding or the like. Thereby, driving voltage is applied to the piezoelectric devices 12a and 13a by the FPC 3b to thereby contract. Corresponding to it, the arms 12 and 13 are deformed in a bending manner.

Next, as shown in FIG. 6, the magnetic head slider 1 is disposed between the pair of arms 12 and 13. At this time, the magnetic head slider is disposed so as to protrude from the tip sides of the arms 12 and 13 as described above. Then, the terminals of the read/write element side of the magnetic head slider 1 and the terminals of the separated part 2b are connected by the soldering 5 or the like.

Then, the magnetic head slider 1 and the respective arms 12 and 13 are fixed to each other with the adhesive 14 such as epoxy. Further, the separated part 2b and the magnetic slider 1 are also fixed to each other by filling an adhesive therebetween.

Note that the arms 12 and 13 of the actuator 10 and the separated part 2b of the flexure are not fixed to each other in the present invention. This is due to the fact that the read/write element of the magnetic head slider 1 protrudes so as to be positioned at the tip side of the arms 12 and 13, whereby they are not in a positioning relationship capable of being fixed. This also leads to simplification of manufacturing process.

[Operation]

Operation of the head gimbal assembly 20, in particular, the actuator 10, configured as described above will be explained.

When a driving voltage is applied to the piezoelectric devices 12a and 13a, they are deformed in an expanding or contracting manner corresponding to the voltage. Due to the expansion or contraction, the arms 12 and 13 which are elastic bodies are deformed in a bending manner almost along the magnetic disk 30 surface. Thereby, the tip parts of the arms 12 and 13 swing in the right and left direction, so the read/write element of the magnetic head slider 1 held on the tip side is precisely swing-driven as shown by the arrow Y in FIG. 6. Since the separated part 2b of the flexure 2 joined to the terminals of the read/write element side is linked to the flexure body 2a only with the elastic FPC 3a, the separated part 2b swings following the swinging operation of the tip side of the magnetic head slider 1. Thereby, it is possible to swing the read/write element of the magnetic head slider 1 almost along the magnetic disk 30 surface, so precise positioning control of the read/write element can be performed.

Since the separated part 2b is joined to the magnetic head slider 1 while being positioned ahead of the tips of the arms 12 and 13, it will never contact the arms 12 and 13.

As described above, according to the actuator 10 which is the present invention, the separated part 2b of the flexure 2 is mounted with an arrangement not to contact the arms 12 and 13 even in the case where the magnetic head slider 1 is thin so as to cope with a magnetic disk of high recording density while keeping the rigidity of the magnetic head slider itself, whereby stable positioning drive can be realized. Specifically, since the tip of the magnetic head slider 1 is held so as to protrude from the tips of the arms 12 and 13, the separated part 2b is also disposed at a position ahead of the tips of the arms correspondingly. As a result, it is possible to set the length of the arms 12 and 13 shorter than the conventional case while keeping the swinging range of the magnetic head slider 1, and further, to set the height of the arms 12 and 13 high while preventing a contact with the separated part 2b. This can improve the strength of the actuator 10.

Further, it is possible to reduce the manufacturing cost since the conventional configuration of an actuator and mounting techniques (mounting process) can be utilized.

In the present invention, the length and height of the arms 12 and 13 of the actuator 10 and the holding position of the magnetic head slider 1 corresponding thereto for example are not limited to the length and holding position described above or shown. Further, although the almost U-shaped actuator 10 is exemplary shown, it is not limited to such a shape.

INDUSTRIAL APPLICABILITY

The microactuator for a magnetic head, which is the present invention, can be used in a head gimbal assembly constituting a hard disk drive, and has industrial applicability.

What is claimed is:

1. A microactuator which holds side faces of a magnetic head slider between arms, comprising:
    a base to be joined to a flexure;
    a pair of arms joined to the base; and
    a PZT device, mounted on each of the pair of arms, which deforms in an expanding or contracting manner based on an applied driving signal, wherein
    a length of each arm is equal to or shorter than a length of the magnetic head slider in a longitudinal direction, and
    each arm is formed to have a height larger than a thickness of the magnetic head slider.

2. A microactuator according to claim 1, wherein a notch is formed in a joint between each of the arms and the base, and a length of the notch is not included in the length of the arm.

3. A head gimbal assembly, comprising:
    a microactuator according to claim 1;
    a flexure; and
    a magnetic head slider,
    wherein the flexure includes a separated part having a trace side terminal to be connected with a terminal of a read/write element side of the magnetic head slider, and is joined to the base of the microactuator, and
    the magnetic head slider is held by the pair of arms so as to protrude from one end side of the pair of arms such that the separated part does not contact the pair of arms.

4. A head gimbal assembly according to claim 3, wherein a protruding distance of the magnetic head slider from the one end side of the pair of arms is at least a distance from a mounting position of the trace side terminal formed on the separated part of the flexure to an end of the separated part of an arm side.

5. A hard disk drive on which a head gimbal assembly according to claim 3 is mounted.

* * * * *